United States Patent [19]

Taylor

[11] 4,325,329

[45] Apr. 20, 1982

[54] METHOD AND APPARATUS FOR PRODUCING ALCOHOL AND AN ALCOHOL-PETROLEUM FUEL MIX

[76] Inventor: Thomas G. Taylor, Rte. 1, Box 136-A, Parkton, N.C. 28371

[21] Appl. No.: 146,282

[22] Filed: May 5, 1980

[51] Int. Cl.³ .............................................. F02B 43/08
[52] U.S. Cl. ...................................... 123/3; 123/1 A; 44/53; 203/DIG. 8
[58] Field of Search ..................... 123/1 A, 3; 203/26, 203/DIG. 8; 44/53, 56

[56] References Cited

U.S. PATENT DOCUMENTS

| | | | |
|---|---|---|---|
| 1,795,670 | 3/1931 | Odell et al. | 123/3 |
| 3,664,134 | 5/1972 | Seitz | 123/1 A |
| 4,031,864 | 6/1977 | Crothers | 123/25 A |
| 4,210,103 | 7/1980 | Dimitroff | 123/575 |

OTHER PUBLICATIONS

Brachvogel, "Industrial Alcohol", pp. 296–297; 362–372, 06/1907.

*Primary Examiner*—Charles J. Myhre
*Assistant Examiner*—E. Rollins Cross
*Attorney, Agent, or Firm*—Mills and Coats

[57] ABSTRACT

The present invention entails a method and apparatus for producing alcohol and mixing the produced alcohol with a conventional petroleum fuel to form an alcohol-petroleum fuel mix which is typically referred to as gasohol. A grain base material such as animal feed or crushed corn is allowed to ferment and during this process there is produced an alcohol base solution which is removed from the mash fermentation and delivered to a boiler mounted on a vehicle. During operation of the vehicle, heat from the vehicle engine exhaust is selectively directed to the boiler and the fermented alcohol base solution contained therein is heated by this exhaust air. As the alcohol base solution is heated there is produced an alcohol vapor which is directed from the boiler to a condenser where the alcohol vapor becomes liquid alcohol. The liquid alcohol is then collected and selectively mixed with a petroleum fuel carried by said vehicle to form the gasohol mix. Once formed, the gasohol mix is then directed to a carburetor operatively associated with the vehicle engine where the gasohol is metered into the engine.

8 Claims, 2 Drawing Figures

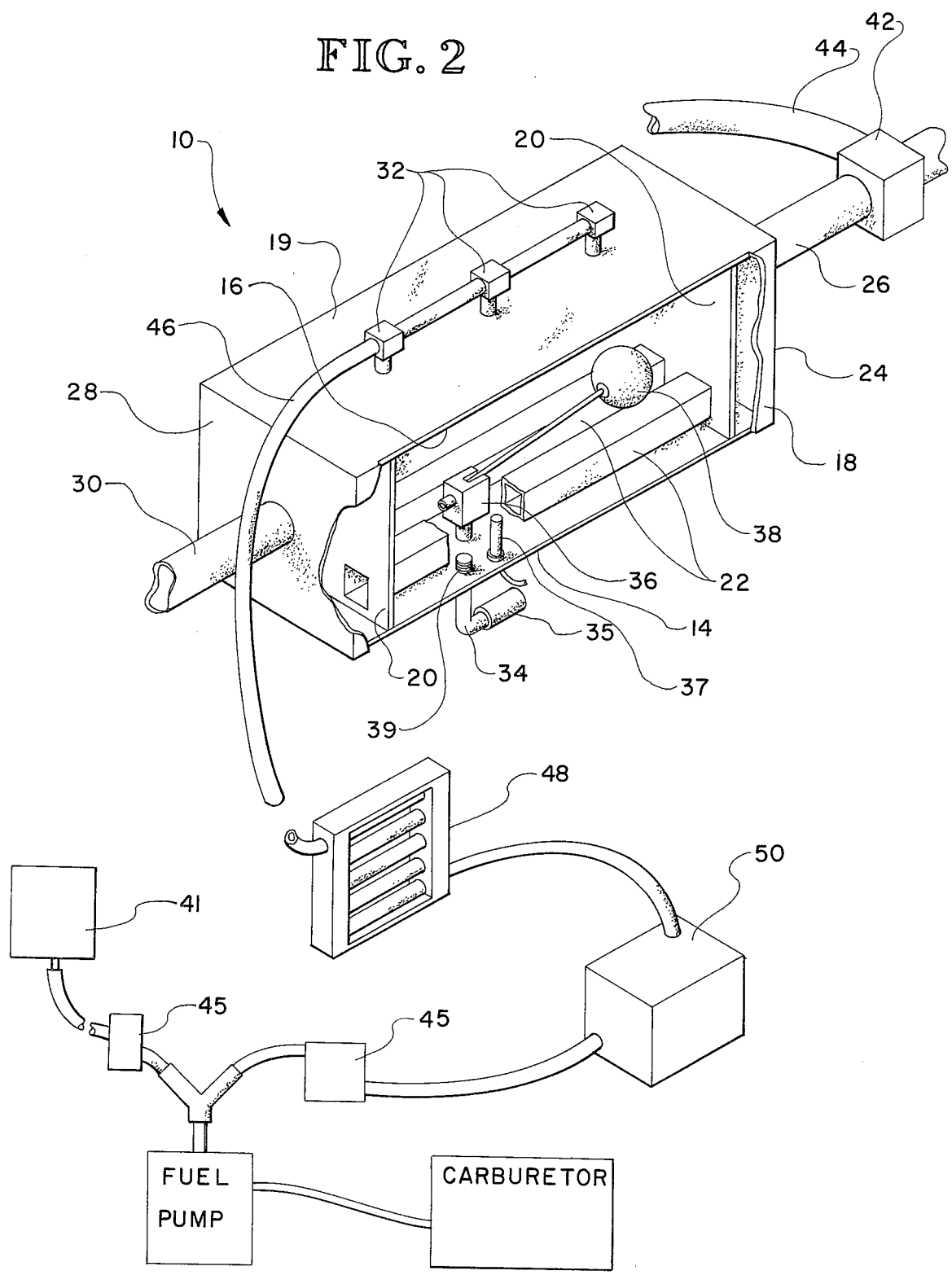

METHOD AND APPARATUS FOR PRODUCING ALCOHOL AND AN ALCOHOL-PETROLEUM FUEL MIX

FIELD OF INVENTION

The present invention relates to vehicles and combustion engines therefor and more particularly to a method and apparatus for producing a combined alcohol-petroleum mix for consumption by the vehicle engine wherein the final alcohol production stages take place on the vehicle during the operation thereof and is accomplished by utilizing heat energy dissipated by the engine.

BACKGROUND OF INVENTION

Today practically everyone is familiar with the energy problems faced by this nation and the world. The cost of petroleum base fuels continues to increase almost daily. In addition, besides the continuing increasing cost of petroleum fuel, consumers have from time to time discovered that petroleum fuel is not available to them at any cost. Nowhere has the scarcity of petroleum fuel been more evident than at gasoline service stations where customers have had to wait in line to purchase gas and/or have been restricted on the quantity of fuel that they may purchase.

This energy situation has led to a policy of conservation on the one hand, and a policy of attempting to develop and utilize alternate sources of energy on the other hand.

It appears that the policy of conservation coupled with an aim to develop alternate sources of energy has at least been partially successful. Yet, in the context of the seriousness of the energy problem, there is still insufficient progress being made in becoming energy independent with respect to petroleum fuels.

In the area of developing alternate sources of energy, alcohol production has gained a lot of attention especially in the area of combining alcohol with petroleum fuel to form gasohol. Today gasohol is commercially available in certain locations, but only on a small scale. Alcohol, under present technology, is expensive to produce and consequently is not clearly economically practical to the extent that the same can displace petroleum fuels. But still alcohol and gasohol offer a promising and encouraging alternate energy source to petroleum fuel. There is a need to develop more efficient means of distilling alcohol so as to minimize the cost, and if significant progress is made in this area, it is believed that alcohol and a resulting alcohol petroleum fuel mix may become more economically feasible and may play a more important role in this nation's energy needs.

SUMMARY OF INVENTION

The present invention entails a practical and economical method and apparatus for producing alcohol and mixing the same with a petroleum fuel to form gasohol. More particularly, the present method and apparatus entails a system that is actually incorporated into the vehicle and which utilizes the dissipated heat energy of the vehicle engine to finish the production of alcohol and this is accomplished simultaneously with the operation of the vehicle. Consequently, the energy utilized in the final or finishing stages of alcohol production is derived from the vehicle engine at no practical cost since the method utilizes the heat energy associated with the exhaust gases of the engine.

The method and apparatus of the present invention contemplates the production of an alcohol base mash from a grain base material such as corn or animal feed. An alcohol base solution is removed from the fermenting grain base mash material and directed to a boiler actually associated with a vehicle. The boiler is operatively associated with the exhaust gases being expelled by the vehicle engine and these exhaust gases are utilized to heat the alcoholic base solution to produce alcohol vapor which is condensed to form liquid alcohol. Once formed the liquid alcohol is selectively mixed with conventional petroleum fuel to form an alcohol-petroleum fuel mix or gasohol, and this fuel mix is directed to a carburetor associated with the engine in conventional fashion.

Consequently it is appreciated that the present method and apparatus contemplates actually performing a substantial portion of the alcohol distilling process on board a vehicle while the vehicle is in operation. This is especially significant inasmuch as the energy associated with the exhaust gases being expelled by the vehicle engine is actually used as the source of energy for the final or finishing phases of the alcohol distillation process.

It is, therefore, the primary object of the present invention to provide a practical and economically feasible method of producing alcohol and combining the same with a petroleum fuel to form gasohol that can be utilized by conventional combustion engines.

Another object of the present invention is to provide a method and apparatus for producing gasohol where the finishing phases of the alcohol production is accomplished on board a vehicle simultaneously with its operation and with the heat energy required being furnished by the engine.

A very important object of the present invention resides in the provision of a method and apparatus for the production of alcohol and the blending thereof with petroleum fuel to form gasohol that is relatively simple and which can be done by the individuals themselves.

It is also an object of the present invention to provide a vehicle with a boiler that is effective and efficient in the finishing production of alcohol and which utilizes only the energy associated with the operation of the vehicle engine to accomplish the finish alcohol production.

Still a further object of the present invention resides in the provision of the method and boiler referred to above wherein there is provided temperature control means for selectively controlling the temperature of the boiler for the efficient production of alcohol.

Other objects and advantages of the present invention will become apparent from a study of the following description and the accompanying drawings which are merely illustrative of the present invention.

BRIEF DESCRIPTION OF DRAWINGS

FIG. 2 shows a perspective view of the boiler with portions cutaway to better illustrate the internal structure thereof, and further illustrates schematically certain components in the total system.

METHOD OF PRODUCING ALCOHOL AND AN ALCOHOL-PETROLEUM FUEL MIX

Figure 1:
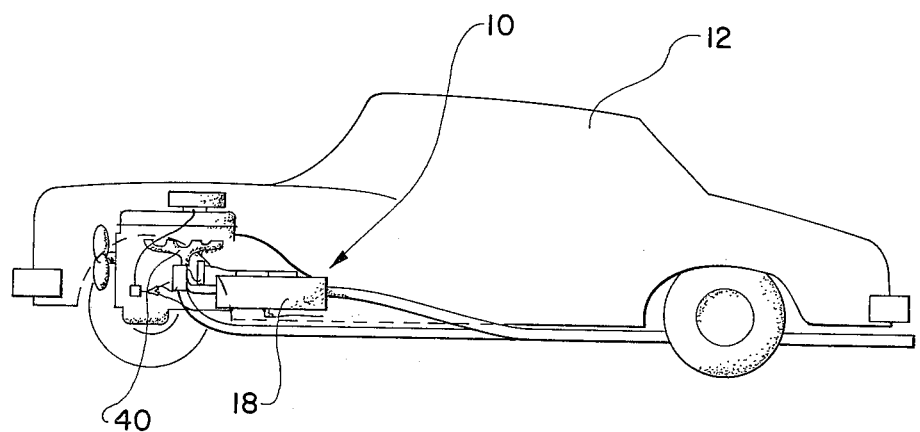
FIG. 1 is a side elevational view of a vehicle having the apparatus for producing alcohol and an alcohol-petroleum fuel mix.

The present invention entails a method of producing alcohol and the first phase is to produce a fermentation solution from a grain base material such as animal feed or directly from corn. This is accomplished by placing a batch of grain base material in a drum and adding water, yeast and sugar to initiate fermentation. Over the course of about five days, the grain base material will ferment and produce an alcohol base solution that will generally lie about the top of the fermentation.

In the way of an example, this alcohol base solution can be produced as follows: First, a peck of crushed corn or other type of grain base material may be placed in a fermentation container. To this there is added approximately 35 pounds of sugar and approximately 1 ounce of yeast. Finally, there is added approximately 50 gallons of warm water. This mixture is allowed to sit and ferment for a period of approximately five days. At that point, the liquid is removed from the fermentation tank. As will be more fully understood from subsequent portions of this disclosure, this alcohol base solution can then be placed in or directed to a boiler for the final alcohol production process.

This alcohol base solution is removed from the drum and containerized.

After this the alcohol base solution is subjected to heat in order to vaporize alcohol from the solution. Generally the alcohol base solution is maintained at a temperature of between 170 and 215 degrees Fahrenheit and this results in the production of an alcohol vapor. The alcohol vapor produced is then directed to a condenser where the vapor is transformed into liquid alcohol. The liquid alcohol can then be combined with conventional petroleum fuel to form gasohol. The proportions of alcohol to petroleum fuel can vary in accordance with the particular application and the desired performance levels. But generally for ordinary internal combustion engines and for highway driving, it is contemplated that the alcohol-petroleum fuel mix would include approximately 20–35 percent alcohol and 65–80 percent petroleum fuel.

ALCOHOL FINISHING BOILER AND FUEL MIXING

With reference to the drawings, there is shown therein a boiler indicated generally by the numeral 10 that is mounted on board a vehicle represented by numeral 12. Boiler 10 may be mounted on vehicle 12 at an appropriate location where the same can be operatively connected with the engine exhaust system of the vehicle and where the same can be appropriately connected to the source of the alcohol base solution that will be directed into the boiler 10 for final alcohol production, or where the alcohol base solution can be conveniently placed in the boiler.

Viewing boiler 10 in more detail, it is seen that the same comprises an elongated rectangular structure that defines a chamber therein by the provision of bottom wall 14, chamber top 16, sides 18 and opposing ends 20. This structure defines an enclosed chamber for receiving the alcohol base solution that is taken from the grain base fermentation discussed hereinabove.

Boiler 10 includes a top and end double wall construction. In this regard, a top 19 is disposed over the chamber top 16 and secured outwardly of ends 20 is an inlet manifold plate 24 and an outlet manifold plate 28. Between the respective manifold plates 24 and 26 and the ends 20, there is defined an open area that serves as a manifold.

Extending above bottom 14 and through the defined chamber is a series of heat tubes 22, with the heat tubes being communicatively connected to the manifold space defined by the inlet and outlet manifold plates 24 and 26. Communicatively connected to inlet manifold plate 24 is an inlet coupling 26. Likewise communicatively connected to outlet manifold plate 28 is an outlet coupling 30.

For providing means for directing the alcohol base solution into the chamber of the boiler 10, there is provided a chamber inlet 34 formed in bottom 14 and communicatively connected, in the present disclosure, to a float valve 36 disposed interiorly of the chamber, with the float valve being actuated by a float and arm assembly 38. Communicatively connected to the chamber inlet 34 is a filter tube 35 for filtering the alcohol base solution prior to its entry into the chamber. Float 38 is adjusted and designed to maintain a desired level of alcohol base solution within the chamber at all times during operation. Moreover, the chamber includes a drain 35 for draining residue from the chamber after alcohol has been produced from the same.

To supply heat to the chamber and to vaporize the alcohol base solution, the engine of vehicle 12 includes an exhaust manifold 40 that directs exhaust gases from the engine to a control valve 42 which is in turn operatively connected to inlet coupling 26. Also operatively connected to control valve 42 is an exhaust by-pass line 44. Consequently by selectively controlling the control valve 42, the quantity of exhaust gases being directed through the chamber and the heat tubes 22 can be varied to yield an appropriate temperature within the chamber, which generally is expected to be in the range of 170 to 215 degrees Fahrenheit. It is appreciated that by actuating the control valve 42 that the quantity of exhaust gases not directed through the chamber and heat tubes 22 would be directed through the by-pass line 44 which would be coupled with a line leading from outlet coupling 30 where the exhaust gases directed to control valve 42 will once again be merged together for appropriate exhaust from vehicle 12.

Provided about bottom 14 is a drain 39 for emptying residue from the chamber and a temperature probe 37 that is operatively connected to a temperature gauge mounted with the vehicle.

Formed about the top of boiler 10 and extending through chamber top 16 and outer top 19 is a series of vapor outlets 32. Vapor outlets 32 are communicatively connected to a vapor line 46 which leads to a condenser 48 which in turn is communicatively connected with an alcohol tank 50.

During the operation of the vehicle, exhaust gases directed through heat tubes 22 acts to vaporize the alcohol base solution resulting in alcohol vapor moving upwardly from the mash solution within the chamber and out the vapor outlets 32 into the vapor line 46. The alcohol vapor is directed from the vapor line 46 into a condenser 48 where the vapor becomes liquid alcohol and this alcohol is then directed to an alcohol holding tank 50. This completes the finishing production of alcohol and now the alcohol may be combined with petroleum fuel to form a gasohol mixture.

To accomplish this, the vehicle fuel pump acts to pump tank 50 while petroleum fuel is pumped from the petroleum tank 41 on the vehicle. The two fuels are each directed through a separate metering valve 45. The metering valves 45 can be appropriately adjusted to yield a desired alcohol-petroleum fuel ratio. Generally, one can expect the final fuel composition to be approximately 25-35 percent alcohol.

From the metering valves 45, the vehicle fuel pump acts to induce the fuel mix therethrough and on into the vehicle carburetor where the fuel mix is used to power the vehicle.

From the foregoing specification, it is seen that the present invention presents an economical and practical approach at producing alcohol and combining the same with a conventional petroleum fuel to form gasohol. Of substantial importance to the present invention is the fact that the final or finishing stages of alcohol production is accomplished on board a particular vehicle by a unique process and alcohol boiler that utilizes the heat energy being dissipated by the engine and the combustion process to actually heat an alcohol base solution to form alcohol vapor and the resulting liquid alcohol composition. This reduces the cost associated with the energy utilized in the finished production of alcohol as the energy of the exhaust gases being exhausted by the vehicle engine is in fact the source of the energy utilized during this final finishing phase of alcohol production.

The present invention, of course, may be carried out in other specific ways than those herein set forth without departing from the spirit and essential characteristics of the invention. The present embodiments are, therefore, to be considered in all respects as illustrative and not restrictive and all changes coming within the meaning and equivalency range of the appended Claims are intended to be embraced therein.

What is claimed is:

1. An on board vehicle alcohol-petroleum fuel producing and blending fuel system for a vehicle having an engine and an exhaust system, and adapted to be mounted on and incorporated into said vehicle for producing and blending alcohol with conventional petroleum fuel to produce a combined alcohol-petroleum fuel composition for consumption and use by said vehicle, said system comprising: a boiler communicatively connected with and operatively associated with said engine and exhaust system for receiving heat from said engine while said vehicle is operating, and adapted to receive a fermented alcohol base solution and to heat the same with heat received from said engine and exhaust system to produce an alcohol vapor that upon condensing gives rise to liquid alcohol; said boiler including a chamber provided with inlet means for receiving said fermented alcohol base solution; heating tube means extending through said boiler and including inlet means operatively connected to the vehicle engine and exhaust system for allowing engine exhaust air to be directed through said heating tube means in heat exchange relationship with said chamber such that the fermented alcohol base solution contained therein may be heated and vaporized; vapor outlet means associated with said chamber for directing alcohol vapor therefrom as the same is generated by said boiler in response to the chamber being heated; condenser means for receiving said alcohol vapor and condensing the same to form liquid alcohol; temperature control means for controlling the temperature of said boiler and including means to selectively meter the quantity of exhaust air that is directed through said boiler so as to effectively regulate the temperature within the chamber thereof; a conventional petroleum fuel tank provided with said vehicle that is adapted to contain conventional petroleum fuel; means associated with said conventional fuel tank for directing said petroleum fuel from said tank to a fuel mixing area; fuel mixing means operatively associated with said vehicle for mixing said produced liquid alcohol with said petroleum fuel for producing a combined alcohol-petroleum fuel composition; and means for directing said mixed alcohol-petroleum fuel composition to the vehicle engine for consumption.

2. The vehicle fuel producing and blending system of claim 1 wherein said alcohol vapor condensing means is communicatively connected with said vapor outlet means of said boiler for receiving alcohol vapor from said chamber and condensing the same into liquid alcohol; and wherein said heating tube means includes a plurality of heat tubes that extend through said chamber.

3. The vehicle fuel producing and blending system of claim 2 wherein said vehicle is provided with a second tank for containing the produced liquid alcohol.

4. The vehicle fuel producing and blending system of claim 3 wherein said boiler includes an elongated chamber with said inlet means provided about the bottom thereof for directing the alcohol base solution into said chamber; and wherein said vapor outlet means includes a plurality of vapor outlets formed along the top of said chamber.

5. The vehicle fuel producing and blending system of claim 4 wherein said boiler includes an end manifold section that includes one central inlet that is operatively connected to said engine exhaust system and wherein said manifold is further communicatively connected to each of a plurality of said heating tubes extending through said chamber.

6. The vehicle fuel producing and blending system of claim 5 wherein said temperature control means further includes a by-pass exhaust line that by-passes said boiler and which is operative to receive exhaust air not directed through said chamber and to channel that exhausts air around said boiler to a common exhaust channel that is operatively connected to an exhaust side of said boiler.

7. An on board vehicle method of producing alcohol and blending the same with a conventional petroleum fuel and utilizing the blended fuel in an engine associated with a vehicle wherein the finished alcohol production phase and blending is actually accomplished simultaneously with the operation of the vehicle, said method comprising the steps of: fermenting a grain base substance such as corn or animal feed to produce a fermented alcohol base solution, removing the fermented alcohol base solution from the mash fermentation; delivering the fermented alcohol base solution to a boiler operatively mounted on a vehicle and communicatively connected to said engine and an exhaust system associated therewith; heating the fermented alcohol base solution with heat from said engine so as to give rise to a resulting alcohol vapor which is derived from the fermented alcohol base solution; said heating including the step of directing exhaust air from said vehicle engine into heat exchange relationship with said boiler for heating and vaporizing the fermented alcohol base solution; controlling the temperature of said boiler by selectively regulating the quantity of exhaust air that is directed in heat exchange relationship to said boiler so as to effectively and efficiently produce alcohol vapor; directing the alcohol vapor from said boiler; condensing the alcohol vapor into liquid alcohol; directing the liquid alcohol to a mixing area on said vehicle and mixing the liquid alcohol with petroleum fuel to form an alcohol-petroleum fuel mix composition; and directing the mixed alcohol-petroleum fuel composition to said engine carburetor where the mixed alcohol-petroleum fuel composition is directed into said engine.

8. The method of claim 7 wherein the step of controlling the exhaust air directed in heat exchange relationship with said boiler includes the step of controlling the temperature within the boiler to a temperature between 170 and 215 degrees Fahrenheit.

* * * * *